No. 606,682. Patented July 5, 1898.
D. H. PEARCE & L. ARBAUGH.
FRUIT GATHERER.
(Application filed May 8, 1894.)
(No Model.)
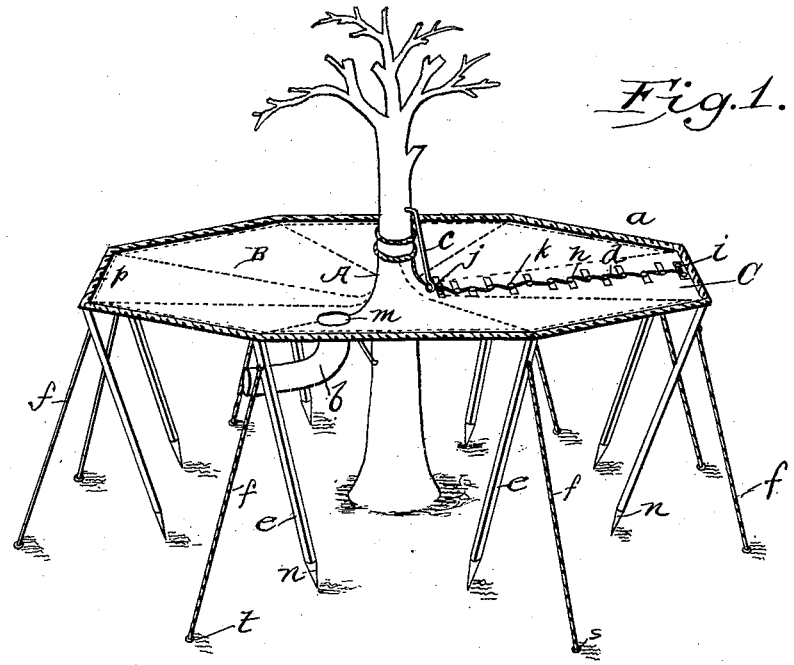
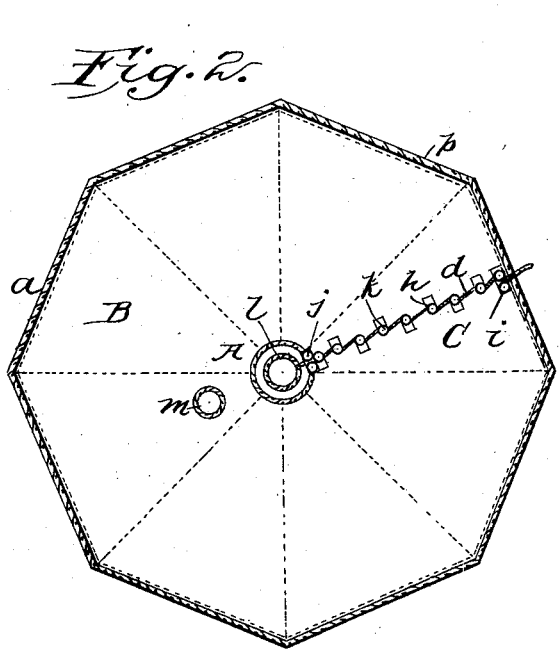
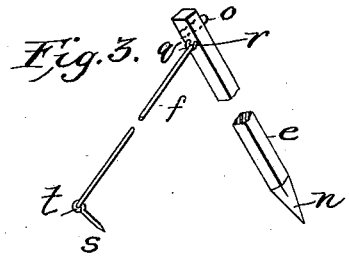
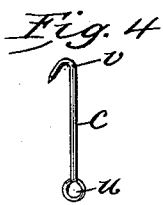
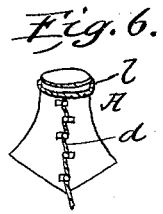
WITNESSES
A. B. Diggs
A. R. Brown
INVENTORS,
Daniel H. Pearce
Leonard Arbaugh
By Chas. J. Gooch Attorney
THE NORRIS PETERS CO., PHOTO-LITHO., WASHINGTON, D. C.

UNITED STATES PATENT OFFICE.

DANIEL H. PEARCE AND LEONARD ARBAUGH, OF ARBAUGH, OHIO.

FRUIT-GATHERER.

SPECIFICATION forming part of Letters Patent No. 606,682, dated July 5, 1898.

Application filed May 8, 1894. Serial No. 510,559. (No model.)

*To all whom it may concern:*

Be it known that we, DANIEL H. PEARCE and LEONARD ARBAUGH, of Arbaugh, in the county of Vinton and State of Ohio, have invented a new and useful Fruit-Gatherer, of which the following is a specification.

This invention relates to improvements in that class of fruit-gatherers designed for application to or support adjacent to a tree for the purpose of receiving the fruit as it falls from the tree.

In the drawings, Figure 1 represents a perspective view of our complete device in position of use around a tree. Fig. 2 represents a top plan view of the fruit receiving and gathering apron in position for use. Fig. 3 represents in detail and partly broken away one of the apron-supporting braces and a brace-stay connected. Fig. 4 represents the apron-suspending rod. Fig. 5 represents the grab-hook. Fig. 6 is a detail view of the collar or neck of the apron.

The object of this invention is to produce a portable device which may be readily transported from place to place and placed around and removed from fruit-trees whereby by simply shaking or jarring the trees the fruit may be expeditiously gathered therefrom and conveyed to suitable receptacles without either bruising or otherwise injuring the fruit, and whereby also the risk of accident to the person gathering fruit when climbing a tree is avoided.

In carrying our invention into effect we construct a fruit-catching apron B of any suitable size, according to requirement, and of any suitable material, as canvas, and of any desired shape—such, for instance, as shown in the drawings, of octagonal shape—
and usually, as indicated in dotted lines, of a series of connected sections, a binding-cord *a* being inserted within and around the circumferential edge of the apron to stiffen the same at that part. The section C of the apron B and the corresponding portion of the conical neck or collar A, which extends upwardly from the center of the apron and embraces the trunk of the tree and also assists in maintaining the apron in position, are slit or divided to form an opening whereby the collar and apron may be readily placed in position, as shown in Fig. 1, around a tree and when desired removed therefrom. At the outer end of the meeting edges *h* of the divisional portion of the section C are secured a pair of parallel lacing-hooks *i*, while at the upper edge of the neck or collar are also a pair of parallel lacing-hooks *j*. Intermediately of these hooks *i* and *j* are secured to the edges *h* an alternating series of lacing-hooks *k*.

*d* represents the lacing-cord by means of which the edges *h* of the section C and of the neck or collar A are secured together, the upper end of said cord *d* being incased in a hem in the top of the collar, and from thence said cord passes to and around the parallel pair of hooks *j* and is thence carried in zigzag direction around the hooks *k* to, and finally secured to, the outer pair of parallel hooks *i*, thereby securely fastening the apron and collar in position.

*m* represents a circular hole or opening formed in the canvas or apron at the base of the neck or collar A, to and through which the fruit falling upon the apron rolls and discharges, by reason of the concavity of the apron, as shown, to and through a curved spout *b*, of any suitable material, as heavy canvas or ducking, the upper end of which spout is secured to the apron so as to surround said discharge-opening *m*, its lower portion depending therefrom in curved contour, as shown, so as to gently and slowly discharge without injury the fruit passing therethrough into barrels, baskets, or other receptacles placed beneath said spout.

*e* represents a series of braces for supporting the apron B at its outer edges and raising said edges, as shown in Fig. 1, so as to give to the apron a concave contour, whereby the fruit as it falls on said apron will automatically gravitate to the discharge-opening *m*. These braces may be of any desired size, shape, and material. In the drawings they are shown as of wood with metal sheathing or point *n* at their lower ends for ready insertion in the ground. At their upper ends these braces are provided with eyes *o*, by means of which they have hinge connection to the cord-strengthened hem *p* of the apron by staples or their equivalent straddling said hem. These braces extend angularly inward from the outer edge of the apron, their degree of angularity, which is readily adjustable, regulating the concavity of the apron, as will be readily understood.

*f* represents a series of preferably metal stay-rods for bracing and firmly holding in position the braces *e* and preventing the swaying and twisting of the apron B. These rods *f* extend angularly outward from the braces and have at their upper ends hinge connection therewith by means of eyes *q* to their upper ends and eyes or staples *r* extending from the braces *e*, whereby the angularity of said stay-rods relatively to the braces may be readily regulated and said rods and braces folded together when not in use. *s* represents anchor-pins or spikes having eyed connection at *t* with the lower ends of said stay-rods.

*c* represents a suspension-rod by means of which the apron is centrally suspended and supported from the trunk of the tree at the proper height. This rod has at its lower end an eye, through which the lacing-cord is passed to connect said end in place on the apron, its upper end being provided with a hook *v*, by means of which connection is had with the trunk of the tree. By thus centrally suspending the apron in connection with the edge braces *e* a concave elasticity is imparted to the apron, which insures the fruit falling on said apron readily rolling thereon to the delivery-spout without injuriously contacting with each other.

*g* represents a grab-hook which at its upper end is formed with an eye *w*, which is attached to the under face of the apron B adjacent to the delivery-opening by any suitable means—as, for instance, a strap, stitching, or the like. The lower portion of this grab-hook *g* has a pair of spring-jaws *x*, having inturned prongs *v*. In use, the grab-hook being secured to the apron, as stated, said hook is drawn down, so as to depress the apron at that portion adjacent to the delivery-opening therein and by reason of such depression or inclination of the apron facilitate the passage of and guide the fruit to such opening. The jaws are then spread apart and the prongs thereof inserted in the trunk of the tree, as shown in Fig. 1, to hold the apron securely in adjusted position.

From the foregoing it will be apparent that our device may be readily, easily, and cheaply constructed and can be expeditiously and easily applied to and removed from trees of varying sizes. The fruit shaken from the tree falls upon an elastic apron and by reason of the elasticity and concavity of said apron and of the curved delivery-spout is automatically delivered, without contusion, bruising, or handling, directly to the receptacles ready for transportation.

Having thus described our invention, what we claim is—

A fruit-gatherer, consisting of an apron having a concaved central portion, a stiffened outer edge, an upwardly-tapering collar extending from and integral with the central concaved portion of the apron and a discharge-opening at the base of said collar, a flexible outwardly-curved spout secured to and depending from the under edge of said discharge-opening an apron-suspension rod having an eyed lower end connected with the apron and a hooked upper end to engage the tree, a bifurcated inturned pronged grab-hook secured at one end to the under face of the apron its prongs being adapted to grasp the tree, a series of inwardly-extending braces having eyed connection with the edges of the apron, a series of outwardly-extending braces also having top eyed connection with the edge of the apron and a series of anchor-pins pivotally connected with the lower ends of the outwardly-extending braces, as set forth.

DANIEL H. PEARCE.
LEONARD ARBAUGH.

Witnesses:
GEORGE P. McCARTY,
RICHARD CRAIG.